United States Patent
Mizukoshi

(10) Patent No.: US 11,399,266 B2
(45) Date of Patent: Jul. 26, 2022

(54) CONTROL APPARATUS, IN-VEHICLE COMMUNICATION SYSTEM, COMMUNICATION CONTROL METHOD AND PROGRAM

(71) Applicant: NEC CORPORATION, Tokyo (JP)

(72) Inventor: Yasuhiro Mizukoshi, Tokyo (JP)

(73) Assignee: NEC CORPORATION, Tokyo (JP)

(*) Notice: Subject to any disclaimer, the term of this patent is extended or adjusted under 35 U.S.C. 154(b) by 135 days.

(21) Appl. No.: 16/981,570

(22) PCT Filed: Aug. 30, 2018

(86) PCT No.: PCT/JP2018/032193
§ 371 (c)(1),
(2) Date: Sep. 16, 2020

(87) PCT Pub. No.: WO2019/187203
PCT Pub. Date: Oct. 3, 2019

(65) Prior Publication Data
US 2021/0067927 A1    Mar. 4, 2021

(30) Foreign Application Priority Data
Mar. 28, 2018 (JP) .............. JP2018-061359

(51) Int. Cl.
*H04W 4/40* (2018.01)
*H04W 4/48* (2018.01)

(52) U.S. Cl.
CPC .............. *H04W 4/40* (2018.02); *H04W 4/48* (2018.02)

(58) Field of Classification Search
CPC ........ H04L 12/2803; H04W 4/40; H04W 4/48
See application file for complete search history.

(56) References Cited

U.S. PATENT DOCUMENTS 9,245,446 B2 * 1/2016 Chen ................. H04W 40/246
2016/0373996 A1 12/2016 Yang et al.

FOREIGN PATENT DOCUMENTS

| CN | 107992321 B | * 4/2021 | .......... G06F 11/1004 |
| JP | 4147738 B2 | * 9/2008 | |
| JP | 2013-143698 A | 7/2013 | |
| JP | 2015-209028 A | 11/2015 | |
| JP | 2016-111477 A | 6/2016 | |

(Continued)

OTHER PUBLICATIONS

OpenFlow Switch Specification Version 1.5.1 (Protocol version 0x06), Open Networking Foundation ONF, 2015, [online], [search on Mar. 16, Heisei 30 (2018)], Internet <URL https://3vf60mmveg1g8vzn48g2o71a-wpengine.netdna-ssl.com/wp-content/uploads/2014/10/openflow-switch-y1.5.1.pdf>, pp. 1-283.

(Continued)

*Primary Examiner* — Thomas R Cairns
(74) *Attorney, Agent, or Firm* — Sughrue Mion, PLLC

(57) ABSTRACT

A control apparatus includes: a control part which controls communication in a vehicle by setting a control entry(ies) to a plurality of switches relaying, by referring to the control entry(ies), a packet(s) input to and output from an ECU(s) installed on the vehicle; and an operation part which performs operation of the control entry according to contents of reprogramming using data for update which updates a program of the ECU(s).

20 Claims, 11 Drawing Sheets

(56) References Cited

FOREIGN PATENT DOCUMENTS

| JP | 2017-005617 A | 1/2017 |
|----|---------------|--------|
| JP | 2017-011670 A | 1/2017 |

OTHER PUBLICATIONS

International Search Report for PCT/JP2018/032193 dated Nov. 13, 2018 [PC/ISA/210].
Written Opinion for PCT/JP2018/032193 dated Nov. 13, 2018 [PC/ISA/237].

* cited by examiner

CONTROL APPARATUS, IN-VEHICLE COMMUNICATION SYSTEM, COMMUNICATION CONTROL METHOD AND PROGRAM

FIELD

Description of the Related Application

The present invention claims the benefit of foreign priority of Japanese Patent Application No. 2018-061359 (filed on Mar. 28, 2018), which is incorporated herein and described by reference in its entirety. The present invention relates to a control apparatus, in-vehicle communication system, communication control method and program.

BACKGROUND

Patent Literature 1 discloses a vehicle-mounted gateway (called "GWECU") which performs protocol conversion between an ECU corresponding to a CAN and an ECU corresponding to a communication protocol other than the CAN. Also, this Literature describes that a gateway monitors a voltage between the ECU corresponding to the CAN and the gateway or a communication cycle period from the ECU corresponding to the CAN in order to prevent that an illegal message is relayed from the ECU corresponding to CAN to the an ECU corresponding to another protocol. Here, "CAN" is an abbreviation of "Controller Area Network" and "ECU" is an abbreviation of "Electronic Control Unit".

Patent Literature 2 discloses a configuration that connects two vehicle-mounted gateways by two communication paths via an Ethernet (hereinafter, "Ethernet" is a registered trademark) path and continues communication by using the one communication path when trouble of the other communication path occurs.

Patent Literature 3 discloses a configuration for causing a repro function to rewrite a program stored in a memory of an ECU by transmitting data for update to the repro function in a vehicle. Further, the repro is an abbreviation of "reprogramming".

In addition, in recent years, a technology called SDN (Software Defined Network) that realizes virtualization of network, by using software is known. Non-Patent Literature 1 is a specification of OpenFlow Switch which is used in a case of constituting the SDN.

Patent Literature 1: Japanese Patent Kokai Publication No. 2016-111477A
Patent Literature 2: Japanese Patent Kokai Publication No. 2017-5617A
Patent Literature 3: Japanese Patent Kokai Publication No. 2015-209028A
Non-Patent Literature 1: OpenFlow Switch Specification Version 1.5.1 (Protocol version 0x06), ONF, [online], [search on March 16, Heisei 30 (2018)], Internet <URL: https://3vf60mmveq1g8vzn48q2o71a-wpengine.netdna-ssl.com/wp-content/uploads/2014/10/openflow-switch-v1.5.1.pdf>

SUMMARY

Following analyses are given by the present invention. As described in Patent Literatures 1 and 2, an in-vehicle network is constructed not by a single network, but by a plurality of the networks for each of functions such as a power train system, body control system, multimedia system, advanced driver assistance and automated driving system, or the other system. Each of the in-vehicle networks is connected to respective one of ECUs which is responsible for each function. On the other hand, it is possible to add a function(s) by program update (also called "reprogramming") using data for update such as Patent Literature 3 in these ECUs.

It is assumed that many ECUs will be installed in a next generation vehicle and they will cooperate with each other and play a critical role represented by automated driving. Naturally, it is considered that there will be many cases where cooperation between the ECUs is required by updating a program(s) of the ECU(s) represented by the reprogramming.

It is an object of the present invention to provide a control apparatus, in-vehicle communication system, communication control method and program that can contribute to save labor of setting work for cooperation between ECUs associated with addition of a function(s) of the ECU(s) installed in a vehicle.

According to a first aspect, there is provided a control apparatus including: a control part which controls communication in a vehicle by setting a control entry(ies) to a plurality of switches relaying, by referring to the control entry(ies), a packet(s) input to and output from an ECU(s) installed on the vehicle, and an operation part which performs operation of the control entry according to contents updating a program of the ECU(s).

According to a second aspect, there is provided an in-vehicle communication system including: a plurality of switches which relays a packet(s) input to and output from an ECU(s) installed in a vehicle by referring to a control entry(ies), and the above control apparatus.

According to a third aspect, there is provided a communication control method in a control apparatus including a control part that controls communication in a vehicle by setting a control entry(ies) to a plurality of switches relaying, by referring to the control entry(ies), a packet(s) input to and output from an ECU(s) installed on the vehicle(s), the method comprising: by the control apparatus, permitting connection of a device updating a program(s) of the ECU(s), and performing operation of the control entry according to contents updating the program(s) of the ECU(s). The method is coupled with a specified machine which is a control apparatus realizing communication in a vehicle by setting a control entry to a switch.

According to a fourth aspect, there is provided a computer program for realizing a function(s) of the above control apparatus. In addition, this program(s) can be recorded in a computer readable (non-transitory) recording medium. Namely, the present invention can also be embodied as a computer program product.

According to the present invention, it is possible to save labor of setting work for cooperation between ECUs associated with addition of a function(s) of the ECU(s) installed in a vehicle.

PREFERRED MODES

Firstly, an overview of an exemplary embodiment of the present invention will be explained by using figures. In addition, drawing reference signs added to the overview are signs added to each element as an example for convenience to help the understanding, and it is not intended that the present invention is limited to an illustrated exemplary embodiment. Further, a connection path between blocks in figures or the like referring to the following description includes both bidirectional and unidirectional. One-way arrow indicates schematically flow of primary signal (data), and does not exclude bidirectionality. In addition, in a connection point of input and output of each block in figures, a port or interface exists, but explicit description is omitted in figures.

Figure 1:
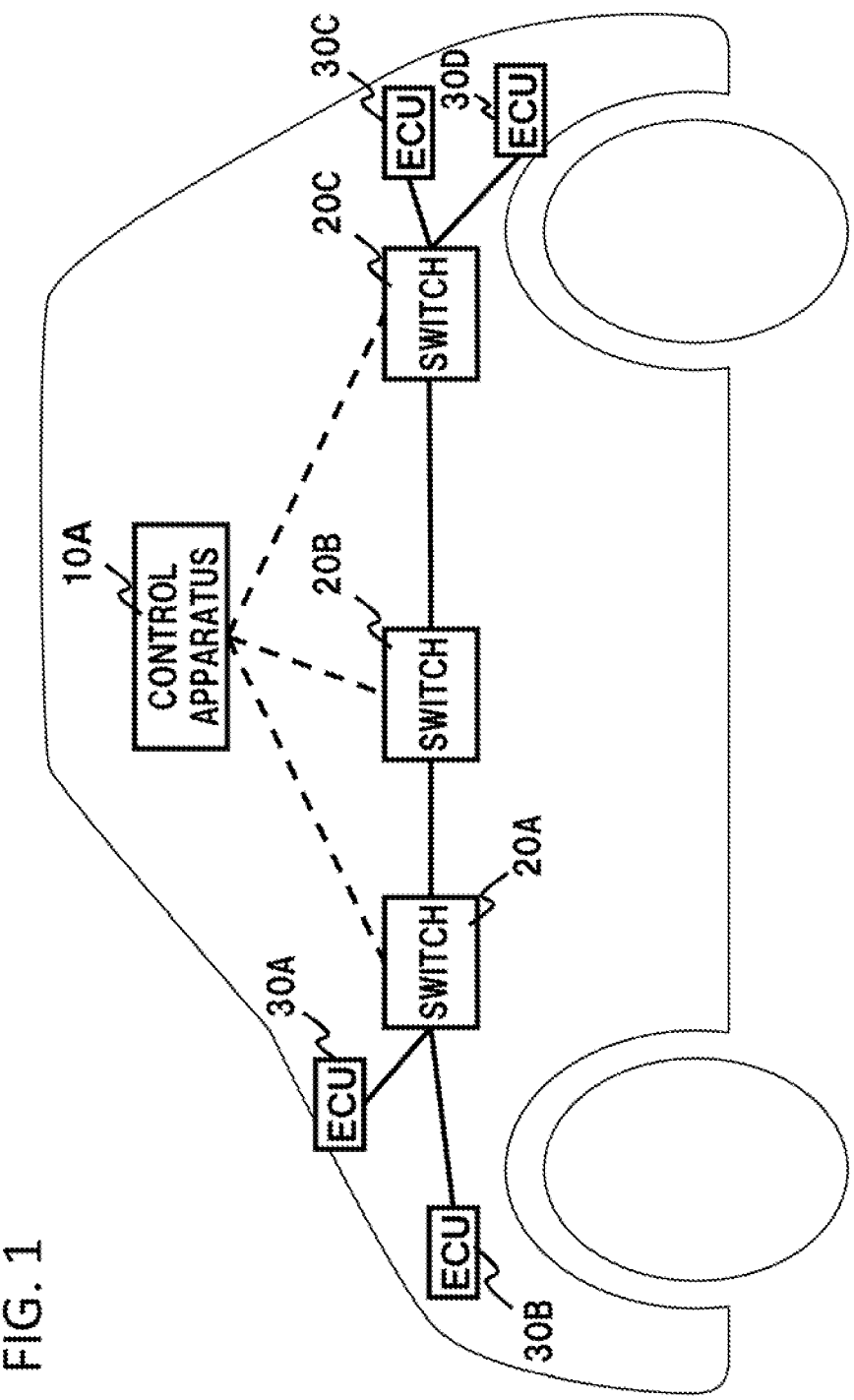
FIG. 1 is a diagram illustrating a configuration of an exemplary embodiment of the present invention.

In an exemplary embodiment, as illustrated in FIG. 1, the present invention is realized by a control apparatus 10A which controls a plurality of switches 20A to 20C (hereinafter, referred to as a "switch 20" as far as it is not necessary to distinguish the switches 20A to 20C especially) installed in a vehicle by referring to a control entry.

More concretely, the plurality of switches 20 relays a packet(s) input to and output from ECUs 30A to 30D (hereinafter, referred to as an "ECU 30" as far as it is not necessary to distinguish the ECUs 30A to 30D especially) installed on the vehicle by referring to the control entry. In addition, though it is explained as that a number of ECU 30 is four in an example of FIG. 1, the number of ECU is not limited to this number.

Figure 2:
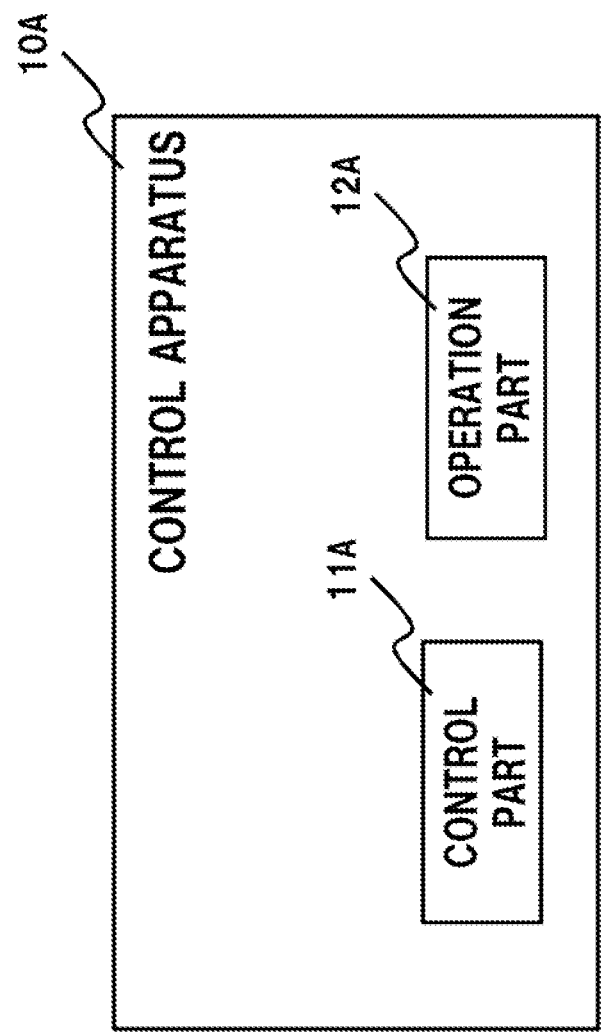
FIG. 2 is a diagram illustrating a configuration of a control apparatus in an exemplary embodiment of the present invention.

And, as illustrated in FIG. 2, the control apparatus 10A includes a control part 11A and operation part 12A. And, the control part 11A controls communication in the vehicle by setting the control entry(ies) to the switch 20. In addition, it is not necessary that the ECU 30 communicates with other all ECU(s) and it is enough to communicate with other ECU(s) relating to an own function or with a sensor. It will be explained as that the control part 11A divides a network constituted by the switch 20 into a plurality of domains logically in the present exemplary embodiment (refer to FIG. 3).

On the other hand, the operation part 12A performs operation of addition, change, deletion, or the like of the control entry(ies) according to contents of reprogramming using data for update which updates a program(s) of the ECU(s).

Figure 3:
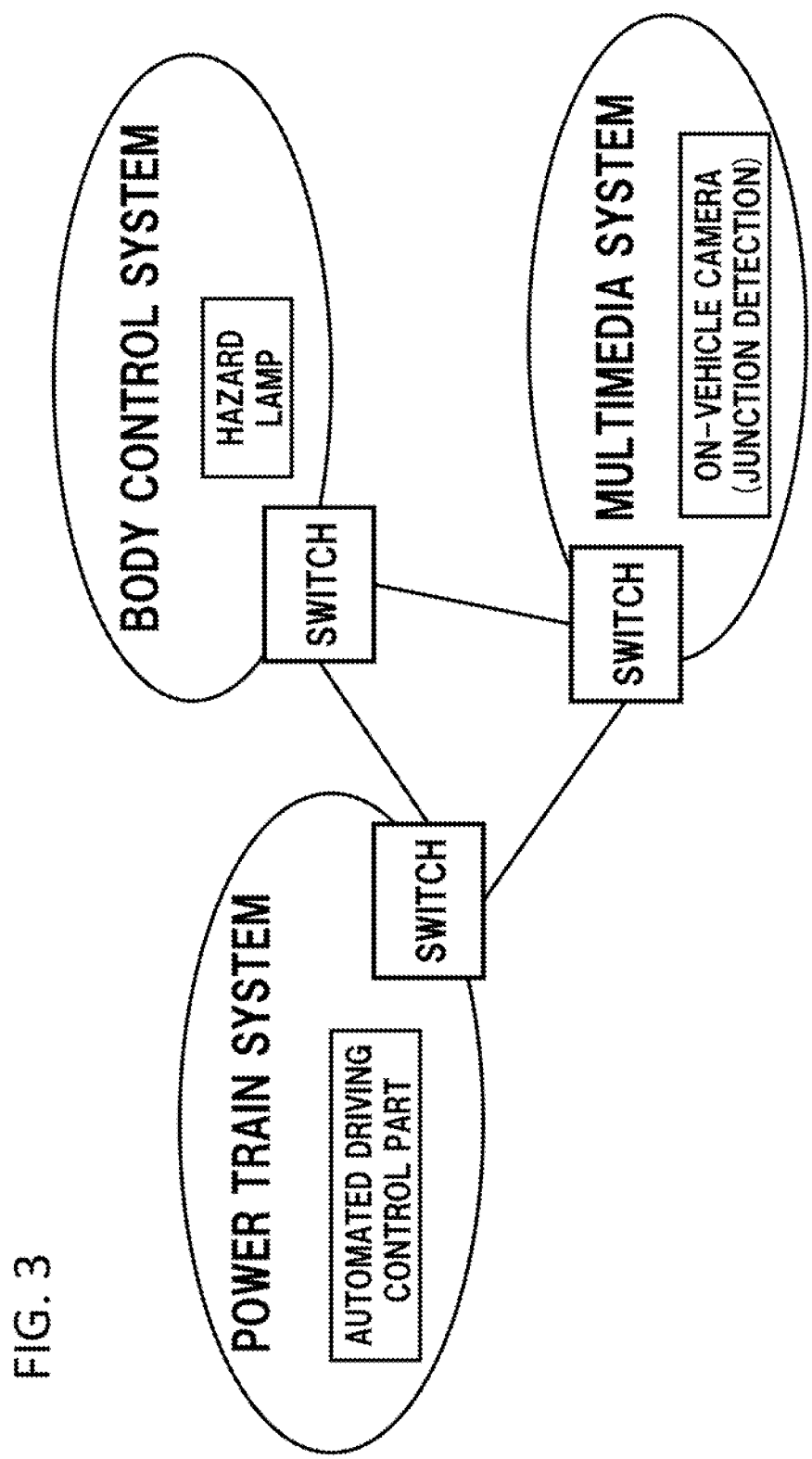
FIG. 3 is a diagram for explaining an operation of a control apparatus in an exemplary embodiment of the present invention.
Figure 4:
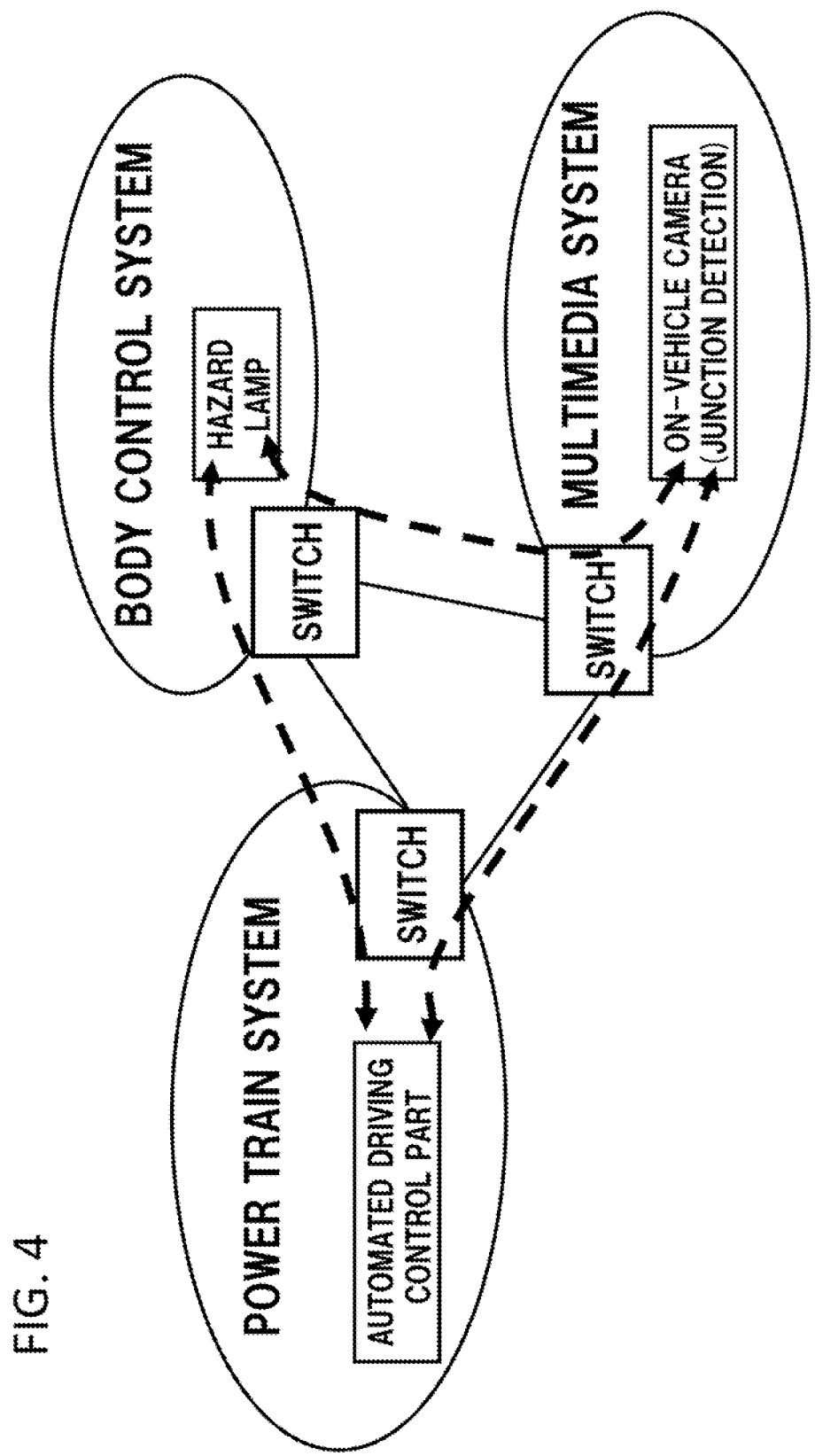
FIG. 4 is a diagram for explaining an operation of a control apparatus in an exemplary embodiment of the present invention.

For example, as illustrated in FIG. 3, it is assumed that the control part 11A divided an in-vehicle network into three networks of a power train system, body control system, and multimedia system by controlling the switch 20. And, it is assumed that a function of blinking a hazard lamp is added by reprogramming in order to raise attention of a following vehicle when merging to a side road of an advanced driver assistance system (ADAS).

In this case, by the reprogramming, a new communication occurs among an ECU which constructs an automated driving control part of the power train system, an ECU which controls a dashboard camera of the multimedia system, and an ECU which controls the hazard lamp of the body control system. Then, the operation part 12A performs operation of the control entry(ies) so that the above each of ECUs can receive a packet(s) under a predetermined condition.

Herewith, it is possible to start utilization of the function promptly after completion of update for a program(s) (reprogramming) in the ECU 30. Of course, it is expected that a certain function(s) is deleted or changed by the reprogramming and there is a case where communication between certain ECUs is no longer required. In this case, the operation part 12A deletes or changes the control entry(ies) of each of the ECUs. Thereby, it is possible to prevent a situation that the switch 20 transfers an unintended packet by an unnecessary control entry.

First Exemplary Embodiment

Figure 5:
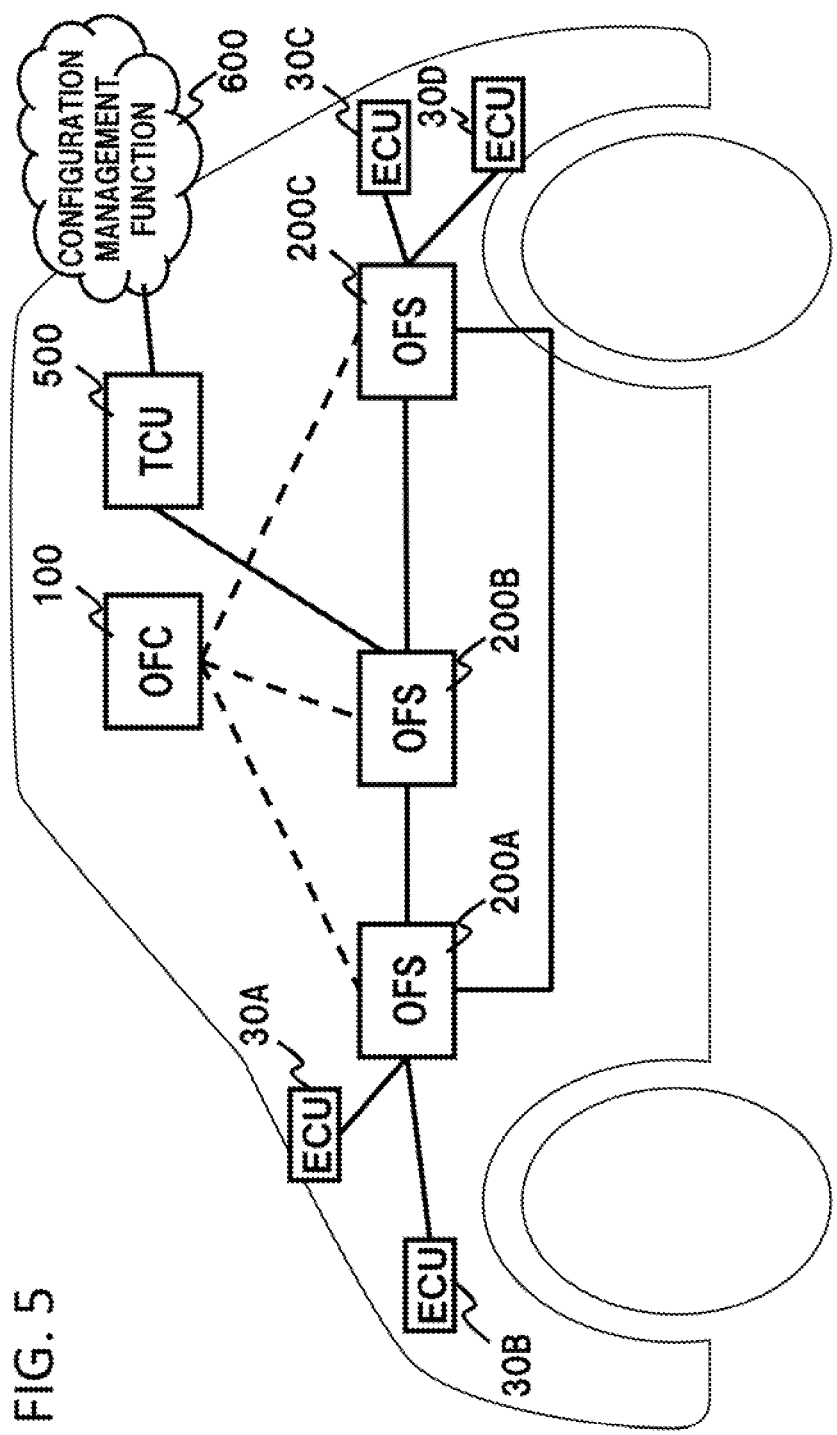
FIG. 5 is a diagram illustrating a configuration of an in-vehicle communication system in a first exemplary embodiment of the present invention.

Successively, it will be explained about a first exemplary embodiment of the present invention by referring to figures in detail. FIG. 5 is a diagram illustrating a configuration of an in-vehicle communication system in the first exemplary embodiment of the present invention. As referring to FIG. 5, a configuration in which an OpenFlow controller (OFC) 100 and a plurality of OpenFlow switches (OFSs) 200A to 200C are arranged in a vehicle is illustrated. Further, hereinafter, it is referred to as an "OFS 200" as far as it is not necessary to distinguish the OpenFlow switches 200A to 200C especially.

The OFC 100 is a device equivalent to an OpenFlow controller described in Non-Patent Literature 1, and corresponds to the above control apparatus 10A.

The OFS 200 selects a communication path and realizes communication between ECUs 30 or communication between the ECU 30 and a sensor in accordance with a flow entry set from the OFC 100. In an example of FIG. 5, the OFS 200 is connected in a ring fashion. In addition, in this way, by connecting the OFS 200 in the ring fashion, it is possible to utilize a bypass path, being not via a link between any of the switches, as a backup path when a path is switched according to a flow type or failure has occurred in the link between any of the switches. In addition, the OFS 200B is connected to a TCU (Tele-Communication Unit) 500 and can connect to a configuration management function 600 of a cloud side via the TCU 500.

The configuration management function 600 of the cloud side communicates with a reprogramming part 104 in the vehicle via the TCU 500 and manages a configuration of the vehicle represented by a version of the ECU 30. In addition, the configuration management function 600 of the cloud side transmits, to the reprogramming part 104, data for update which updates a program(s) of an ECU(s), and cause the reprogramming part 104 to execute reprogramming, if necessary. In addition, this data for update includes communication control information (combination of the ECUs whose new communication is permitted or prohibited) associated with the reprogramming. Further, as the communication control information, not the combination of the ECUs whose new communication is permitted or prohibited but the flow entry(ies) which sets to each of the OFSs 200 or a path information may be transmitted.

The OFC 100 and OFS 200 are connected via a control channel illustrated by broken lines of FIG. 5.

The ECU 30 is a device which controls each part of the vehicle such as an engine, electric motor, battery, transmission gear, or the like, for example. In addition, it is assumed that the ECU 30 corresponds to any of a CAN or Ethernet in the present exemplary embodiment.

Figure 6:
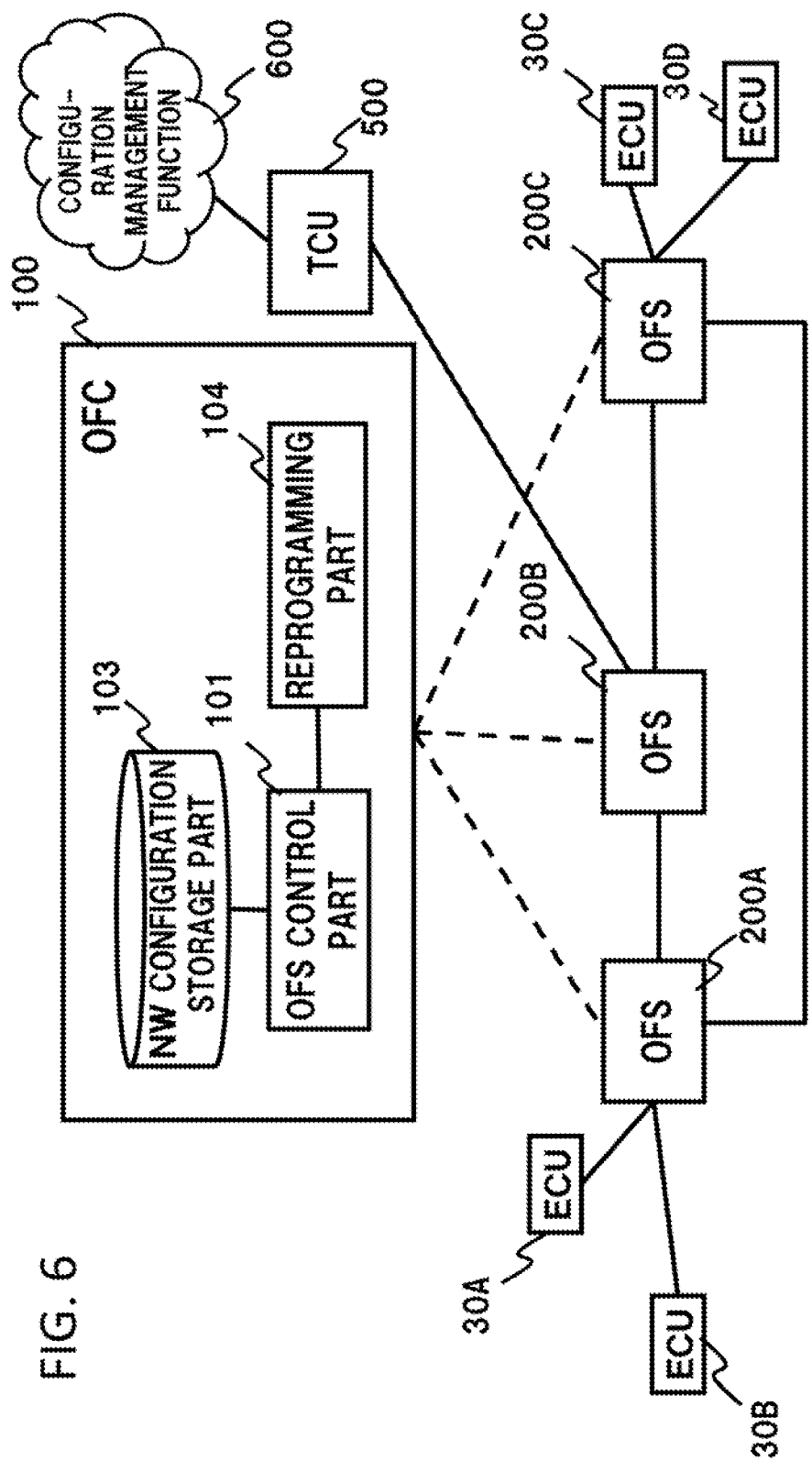
FIG. 6 is a diagram illustrating a schematic configuration of an in-vehicle communication system in the first exemplary embodiment of the present invention.

Successively, it will be explained about a configuration of the OFC 100 realizing the communication between the above ECUs 30 by referring to figures in detail. FIG. 6 is a diagram illustrating schematic configuration of the in-vehicle communication system in the first exemplary embodiment of the present invention. The OFC 100 in FIG. 6 includes an OFS control part 101, the reprogramming part 104, and a network configuration storage part (NW configuration storage part) 103.

The NW configuration storage part 103 stores information of connection relation of the plurality of OFSs 200 and information of the ECU, the sensor, or the like connected to each of the OFSs. When there is a difference in communication band ranges (data transfer speed) in a link between the OFSs 200, the NW configuration storage part 103 may hold these information. Herewith, it is possible to cause the OFC 100 to calculate a path that can secure a required communication band range (data transfer speed) for communication between the ECUs.

The OFS control part 101 generates a flow entry realizing the communication between the ECUs 30 by referring to the NW configuration storage part 103 and sets it to the OFS 200. Further, the OFC 100 need not generate the flow entry on each occasion and some of the flow entries may be set at the time the vehicle is shipped for example. On the other hand, when any trouble of a device or OFS has occurred, the OFC 100 may set an alternate path of the OFS control part 101 or a path for a predetermined backup to the ECU dynamically. Since a basic operation of these the OFC 100 and OFS 200 is described in Non-Patent Literature 1, explanation is omitted.

When the reprogramming part 104 receives, from the configuration management function 600 of the cloud side via the TCU 500, data for update which updates a program(s) of an ECU(s), the reprogramming part 104 executes reprogramming. In addition, when the reprogramming part 104 completes the reprogramming, the reprogramming part 104 extracts communication control information (combination of the ECUs whose new communication is permitted or prohibited) to be applied with the reprogramming from the data for update and transmits it to the OFS control part 101. Therefore, the OFS control part 101 and reprogramming part 104 perform operation equivalent to the above operation part 12A in the present exemplary embodiments.

Figure 7:
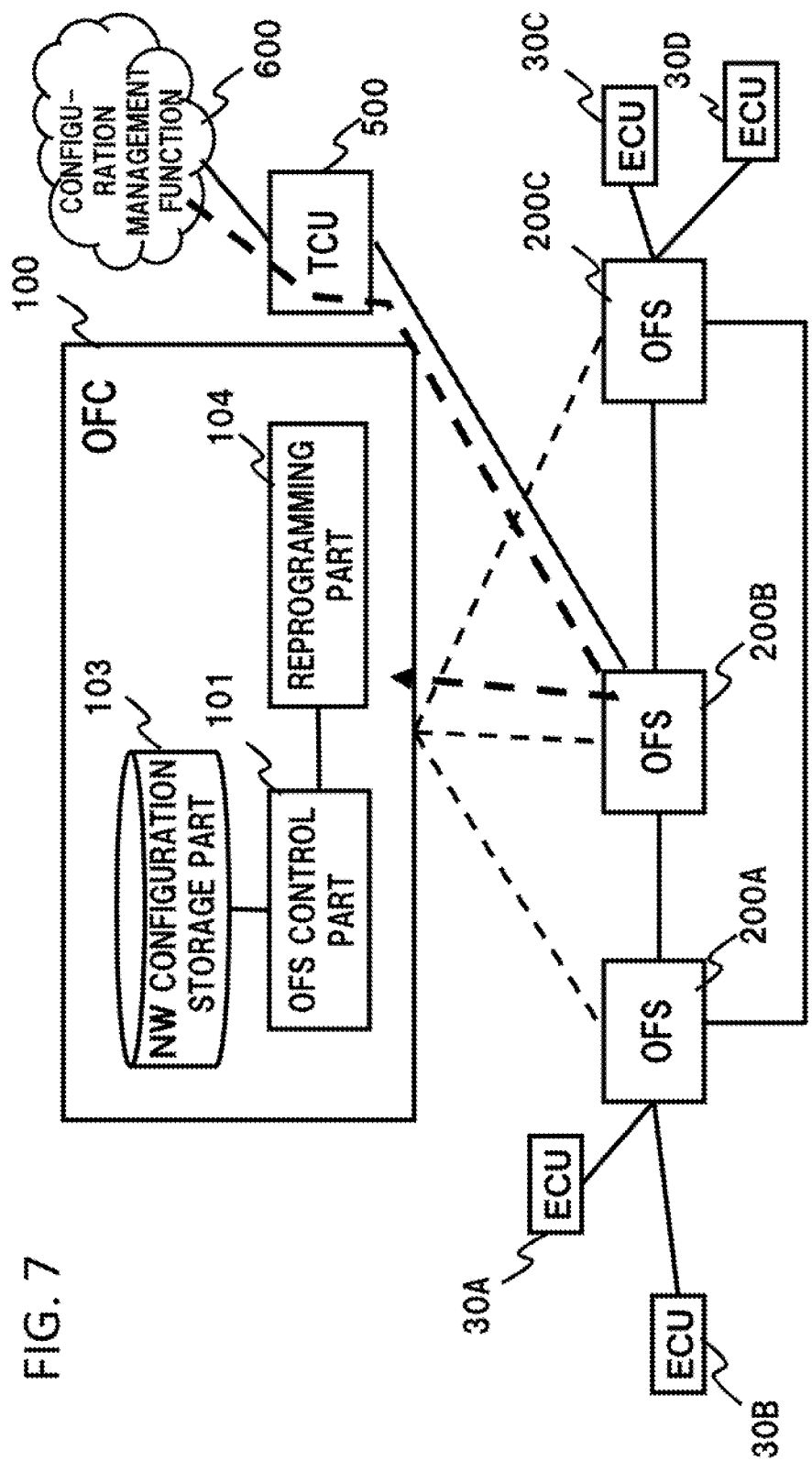
FIG. 7 is a diagram for explaining an operation of the first exemplary embodiment of the present invention.

Successively, it will be described about an operation of the present exemplary embodiment by referring to figures in detail. For example, as illustrated in FIG. 7, it is assumed that data for update of the ECU 30 is transmitted from the configuration management function 600 of the cloud side at a predetermined timing such as release of a new function(s) by a manufacturer of a vehicle or various on-vehicle components. In the following explanation, it will be explained under an assumption that functions of the ECU 30A and ECU 30D are updated and communication between the ECU 30A and ECU 30D occurs by the functions after updating.

The data for update of the ECU 30 is received by the reprogramming part 104 of the OFC 100 via the TCU 500 and OFS 200B.

Figure 8:
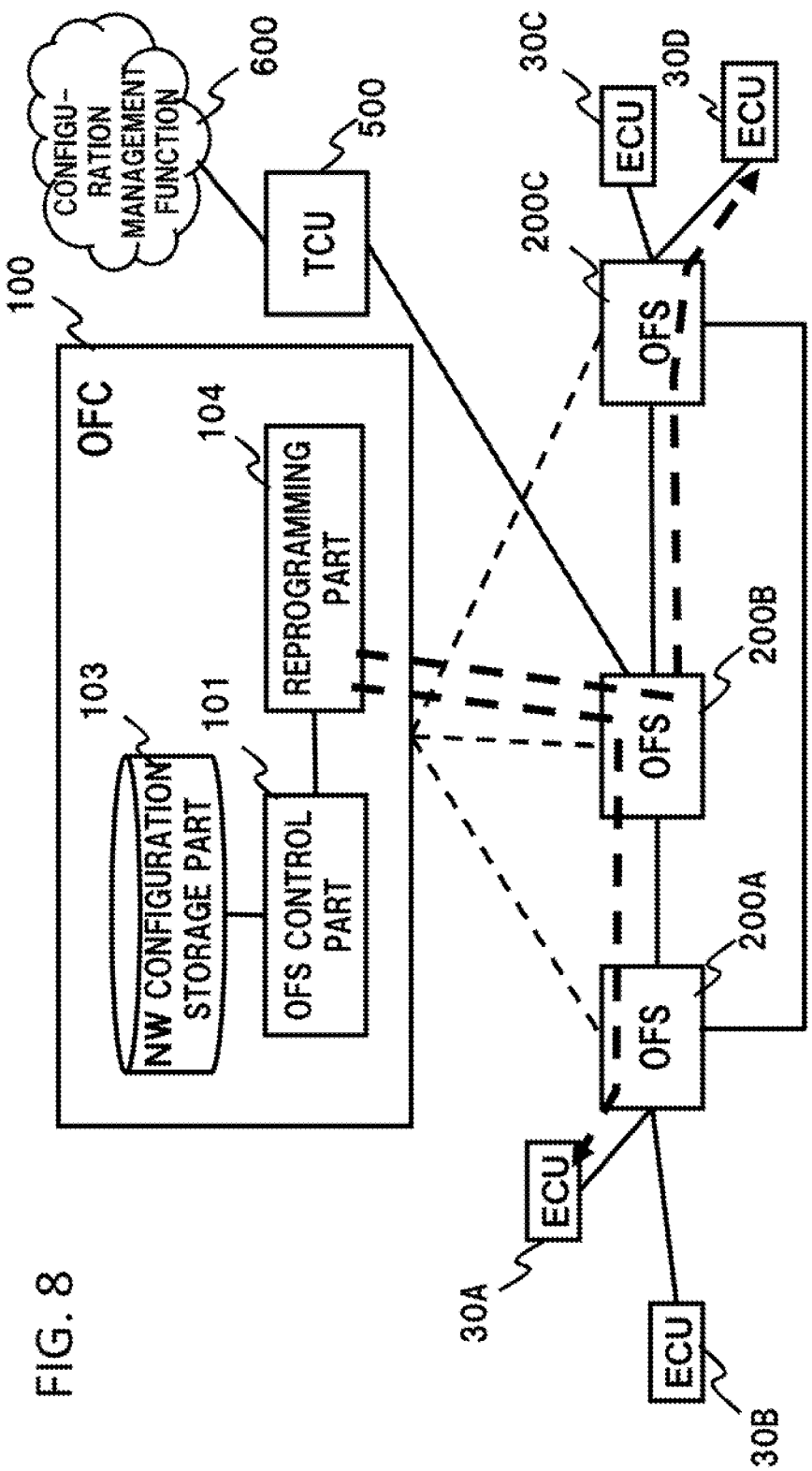
FIG. 8 is a diagram for explaining an operation of the first exemplary embodiment of the present invention.

As illustrated in FIG. 8, when the reprogramming part 104 of the OFC 100 receives the data for update, the reprogramming part 104 executes reprogramming of the ECU 30A and ECU 30D. Since a scheme of an OpenFlow is used in the present exemplary embodiment, it is possible to execute the reprogramming to the plurality of the ECUs in parallel as far as contention of communication, that is, contention of a match condition of the flow entry does not occur.

Examples of this reprogramming include the following:
(1) When automated driving level 3 (automated driving with condition) is selected by a driver, a height position of a driver's sheet is lowered by a predetermined amount.
(2) When the automated driving level 3 (automated driving with condition) is selected, an operation interval of a wiper is fixed at a specified value in a rainy weather or at night.
(3) When the automated driving level 3 (automated driving with condition) is selected, automatic control which switches light distribution patterns of headlights in the rainy day or at the night according to vehicle circumstances is started.
(4) When the automated driving level 3 (automated driving with condition) is selected, a recognition rate is raised by lowering a compression rate of a camera loaded on a vehicle and improving sensitivity in the rainy day or the at night.

Figure 9:
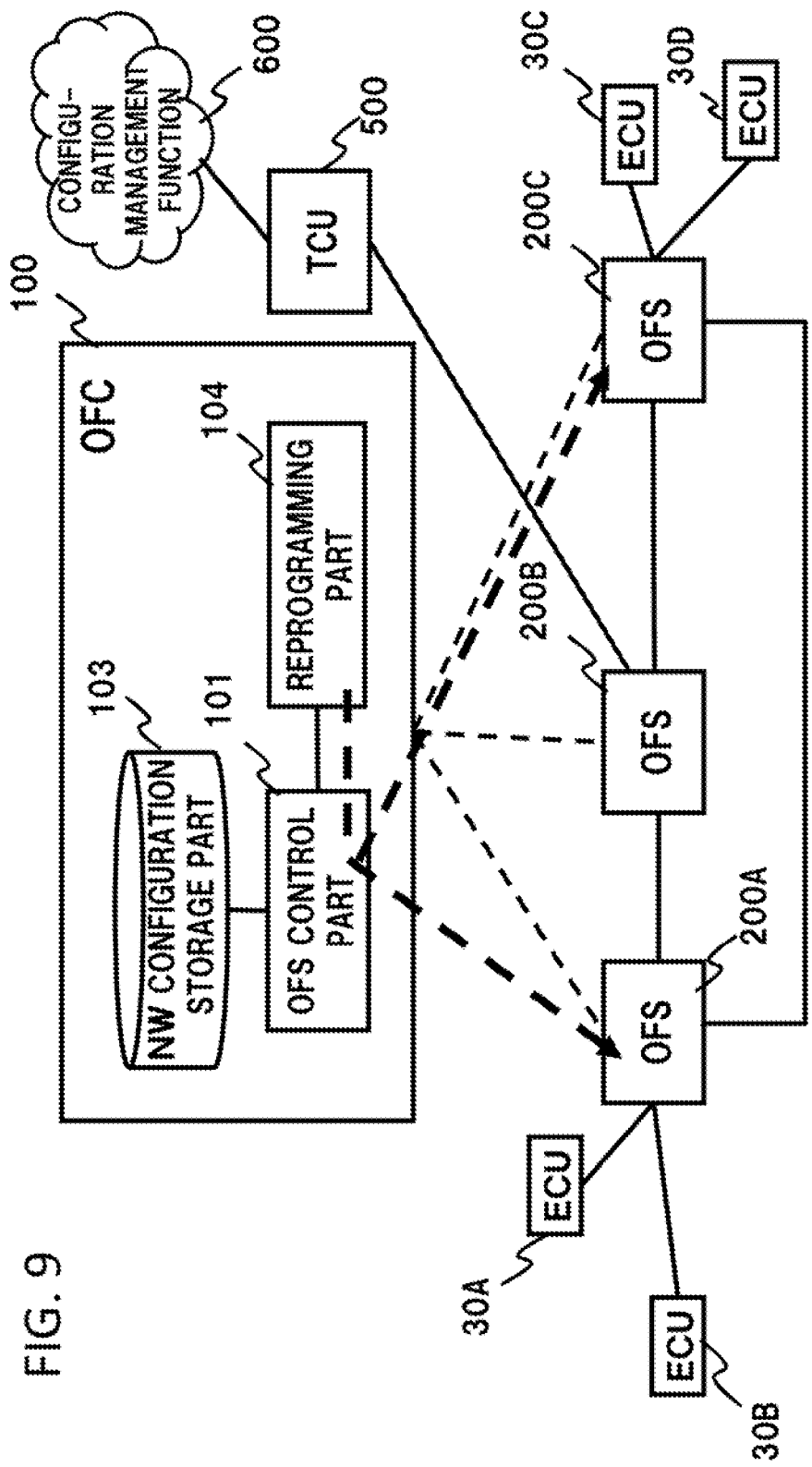
FIG. 9 is a diagram for explaining an operation of the first exemplary embodiment of the present invention.

As illustrated in FIG. 9, when the reprogramming is completed, the reprogramming part 104 of the OFC 100 extracts communication control information from the data for update and transmits it to the OFS control part 101.

The OFS control part 101 of the OFC 100 having received the communication control information refers to information of the NW configuration storage part 103 and calculates a path(s) between the ECUs 30 specified in the communication control information. Here, it is assumed that a path via the OFS 200A, 200B, and 200C is calculated as a path between the ECU 30A and 30D. Next, as illustrated in FIG. 9, the OFC 100 sets, to the OFS 200A, 200B, and 200C on the path, a flow entry causing to transfer a communication between the ECUs 30A and 30D. It is preferable that information to specify the communication between the ECU 30A and 30D is set in a match condition of the flow entry(ies). Examples of the information include each communication address of the ECU 30A and 30D, other header information in a received packet, or the like. In addition, in the above flow entry, a required communication band range (data transfer speed) associated with the above (3) to (4) or the like may be set. In addition, some of the ECUs of a communication destination requires protocol conversion. In this case, a flow entry performing conversion of a CAN frame and Ethernet frame exemplified in Non-Patent Literature 1 may be set to the OFS 200.

Figure 10:
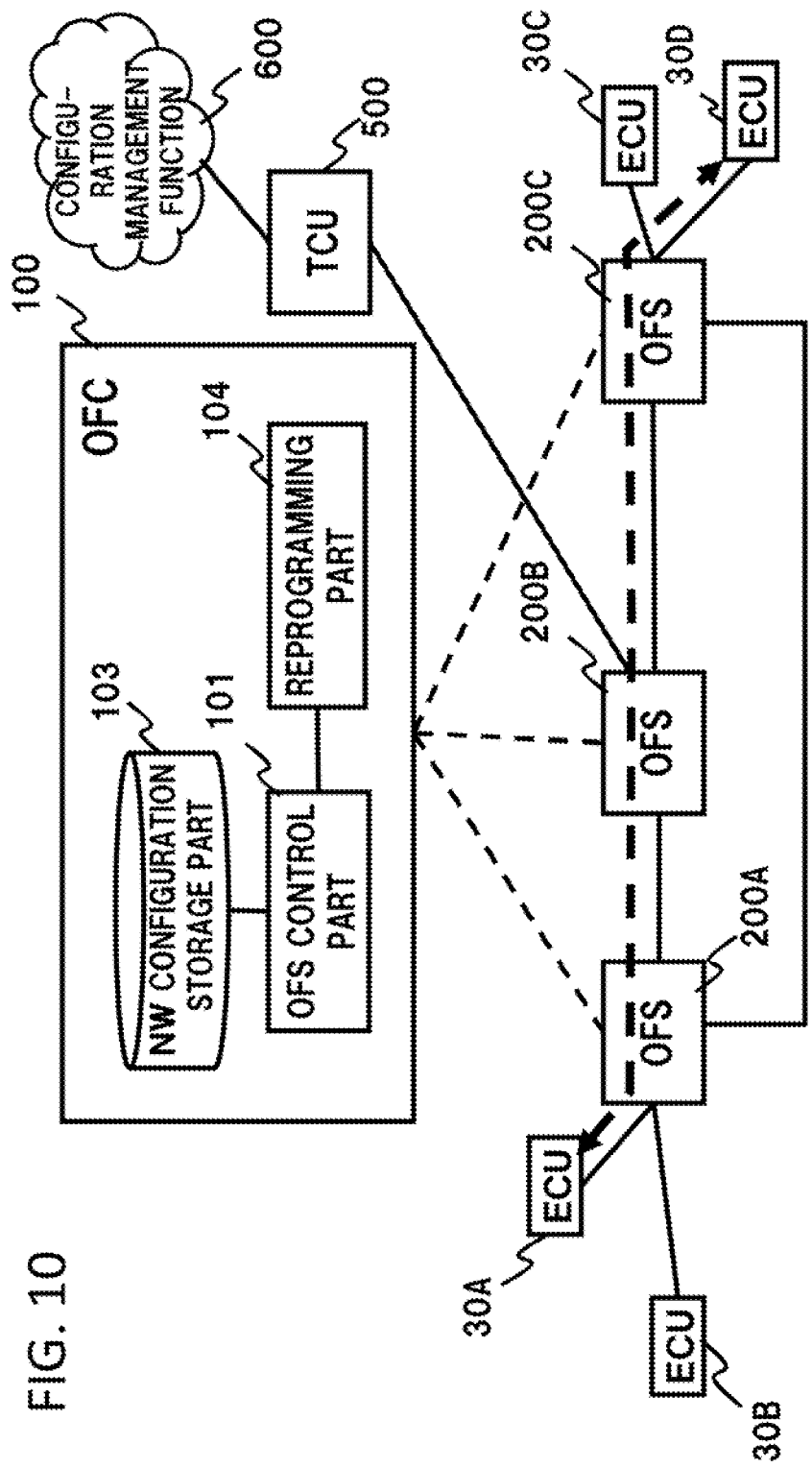
FIG. 10 is a diagram for explaining an operation of the first exemplary embodiment of the present invention.

As a result, as illustrated in FIG. 10, it is possible to permit the communication between the ECU 30A and 30D and utilize a new function by the reprogramming, promptly after the reprogramming. This reason resides in that a configuration being capable of executing communication control cooperated with the reprogramming of the ECU 30 is adopted.

Further, by the reprogramming, sometimes utilization of a specified function(s) is prohibited because of a security perspective. In this case, the OFC 100 in the present exemplary embodiment deletes or changes the corresponding flow entry and disconnects corresponding communication. Even if the ECU transmits a packet(s) which should not be transmitted inherently, since the communication is disconnected, these deletion or rewriting of the flow entry(ies) by the OFC 100 in the present exemplary embodiment works as a kind of a fail-safe mechanism.

Further, by the reprogramming, there may be also a case where utilization of a prohibited specific function(s) previously becomes possible. A configuration that a certain ECU will be able to utilize a specific function(s) by capability of receiving data which has been transmitted but has been disconnected by control of the OFC 100 is also supposed. In this case, the OFC 100 in the present exemplary embodiment performs operation of a flow entry such as deletion of the flow entry which has disconnected the corresponding communication, change or set of a required flow entry.

Though each of exemplary embodiments of the present invention is explained, the present invention is not limited to the above exemplary embodiments, and it possible to add further modification, replacement, and adjustment within a range not deviating from technical idea of the present invention. For example, a network configuration, a configuration of each element, and an expression form of a message illustrated in each figure are examples to facilitate the understanding of the present invention, and are not limited to the configurations illustrated in these figures. Further, in the following description, "A and/or B" is used in the sense of at least any one of A and B.

For example, though it is explained as that the switches in the vehicle are controlled by using the OpenFlow in the above exemplary embodiments, it is possible to realize the present invention by using a scheme other than the Open-Flow.

In addition, though it is explained as that the data for update of the ECU 30 is received from the configuration management function 600 of the cloud side in the above exemplary embodiments, a transmission main part of the data for update is not limited to this example. For example, it may be a device which transmits the data for update to an ECU via a communication interface such as OBD (On Board Diagnosis), OBD2 (OBD second generation), or the like. In this case, a control apparatus or OFC performs control permitting a communication between a device which performs these reprogramming and the ECU.

Figure 11:
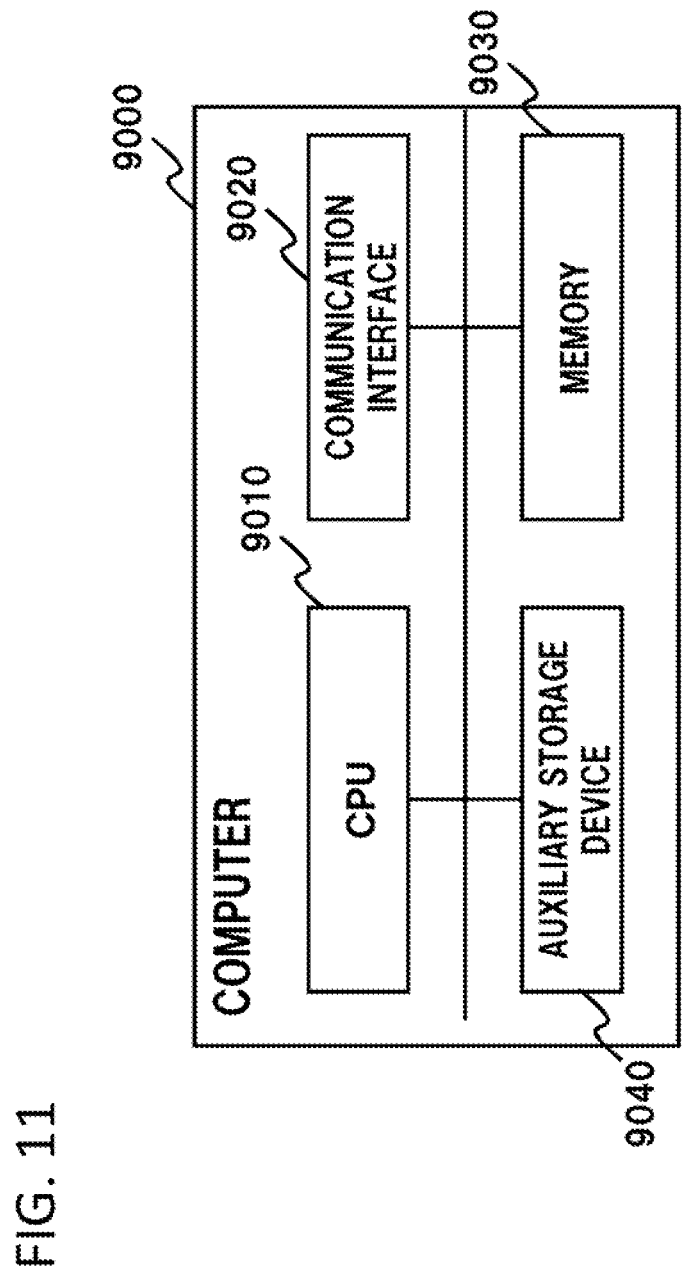
FIG. 11 is a diagram illustrating a configuration of a computer configurating a control apparatus of the present invention.

In addition, procedures described in the above first and second exemplary embodiments are possible to realize by a program causing a computer ("9000" in FIG. 11) functioning as the control apparatus or the OFC to realize functions as these apparatuses. This computer is exemplified as a configuration including a CPU (Central Processing Unit) 9010, communication interface 9020, memory 9030, auxiliary storage device 9040 of FIG. 11. That is, it is enough to cause the CPU 9010 of FIG. 11 to execute a switch control program or reprogramming processing program and execute an update processing of each calculation parameter held in the auxiliary storage device 9040 or the like.

That is, the each part (processing means, function) of the control apparatus or the OFC described in the above exemplary embodiments can be realized by a computer program causing a processor installed in the control apparatus or the OFC to execute the above each processing by using its hardware.

Finally, preferable Modes of the present invention are summarized.

[First Mode]

(Refer to the control apparatus according to the first aspect.)

[Second Mode]

It is preferable that operation of the control entry(ies) by the operation part of the above control apparatus is performed on the basis of contents of reprogramming using data for update which updates a program of the ECU.

[Third Mode]

Operation of the control entry by the above control apparatus is to permit or prohibit communication between the ECUs corresponding to a function(s) added by the reprogramming.

[Fourth Mode]

The control part of the above control apparatus permits communication between a device performing the reprogramming and an ECU subjected to the reprogramming, and the operation part can adopt a configuration performing operation of the control entry(ies) after completion of the reprogramming.

[Fifth Mode]

When changed contents (the above communication control information) of the control entry(ies) is included in the data for update, the control part of the above control apparatus can adopt a configuration of extracting the changed contents of the control entry(ies) from the data for update and indicating to the operation part.

[Sixth Mode]

The control part of the above control apparatus can set, to the switch(es), a control entry causing to execute protocol conversion between the device and ECU(s), too.

[Seventh Mode]

(Refer to the in-vehicle communication system according to the second aspect.)

[Eighth Mode]

(Refer to the communication control method according to the third aspect.)

[Ninth Mode]

(Referring to the program according to the fourth aspect.)

Further, it is possible that the modes of seventh to ninth are expanded to the modes of second to sixth in the same way as the first mode.

Further, it is regarded that the above patent literatures and non-patent literature are incorporated by reference in the present application. Within the entire disclosure of the present invention (including claims), and based on the basic technical concept, it is possible to change and adjust the exemplary embodiments or examples. Also, various combinations or selections (including partial removal) of different disclosed elements (including each element of each claim, each element of each exemplary embodiment or example, each element of each figure, or the like) within the entire disclosure of the present invention are possible. That is, in the present invention, it is of course natural to include various variations or modifications that could be made by a person skilled in the art according to the entire disclosure including claims and the technical concept. Especially, even if there is no explicit description with respect to any number or small ranges included in a numerical range described in the present application, it should be interpreted as such be concretely described in the present application.

REFERENCE SIGNS LIST 10A control apparatus
11A control part
12A operation part
20, 20A to 20C switch
30, 30A to 30D ECU
100 OpenFlow controller (OFC)
200, 200A to 200C OpenFlow switch (OFS)
101 OFS control part
103 network configuration storage part (NW configuration storage part)
104 reprogramming part
500 TCU
600 configuration management function
9000 computer
9010 CPU
9020 communication interface
9030 memory
9040 auxiliary storage device

The invention claimed is:

1. A control apparatus, comprising:
at least one memory configured to store instructions; and
at least one processor configured to execute the instructions to:
control communication in a vehicle by setting a control entry(ies) to a plurality of switches relaying, by referring to the control entry(ies), packet(s) input to and output from an Electronic Control Unit(s) (ECU(s)) installed on the vehicle; and
perform operation of the control entry according to contents updating a program of the ECU(s).

2. The control apparatus according to claim 1, wherein
the operation of the control entry(ies) is performed on the basis of data for update for reprogramming which updates a program of the ECU.

3. The control apparatus according to claim 2, wherein
communication between a device performing the reprogramming and the ECU(s) subjected to the reprogramming is permitted, and
the operation of the control entry(ies) is executed after completion of the reprogramming.

4. The control apparatus according to claim 2, wherein
the data for update includes changed contents of the control entry(ies), and
extraction of the changed contents of the control entry(ies) from the data for update is executed.

5. The control apparatus according to claim 2, wherein
the control entry is to permit or prohibit communication between the ECUs corresponding to a function added by update of the program of the ECU(s).

6. The control apparatus according to claim 2, wherein
the control apparatus sets, to the switch(es), a control entry(ies) causing to execute protocol conversion of a packet input to and output from the ECU(s).

7. The control apparatus according to claim 1,
wherein the operation of the control entry is to permit or prohibit communication between the ECUs corresponding to a function added by update of the program of the ECU(s).

8. The control apparatus according to claim 1, wherein
the control apparatus sets, to the switch(es), a control entry(ies) causing to execute protocol conversion of a packet input to and output from the ECU(s).

9. An in-vehicle communication system, comprising:
a plurality of switches which relays a packet(s) input to and output from an Electronic Control Unit(s) (ECU(s)) installed in a vehicle by referring to a control entry(ies); and
the control apparatus according to claim 1.

10. A communication method in a control apparatus that controls communication in a vehicle by setting a control entry(ies) to a plurality of switches relaying, by referring to the control entry(ies), a packet(s) input to and output from an Electronic Control Unit(s) (ECU(s)) installed on the vehicle, the method comprising: by the control apparatus,
permitting connection of a device updating a program(s) of the ECU(s); and
performing operation of the control entry according to contents updating the program(s) of the ECU(s).

11. The communication method according to claim 10, wherein
the operation of the control entry(ies) is performed on the basis of data for update for reprogramming which updates a program of the ECU.

12. The communication method according to claim 11, wherein
communication between a device performing the reprogramming and the ECU(s) subjected to the reprogramming is permitted, and
the operation of the control entry(ies) is executed after completion of the reprogramming is permitted.

13. The communication method according to claim 11, wherein
the data for update includes changed contents of the control entry(ies), and
extraction of the changed contents of the control entry(ies) from the data for update is executed.

14. The communication method according to claim 10, wherein
the operation of the control entry is to permit or prohibit communication between the ECUs corresponding to a function added by update of the program of the ECU(s).

15. The communication method according to claim 10, wherein
the control apparatus sets, to the switch(es), a control entry(ies) causing to execute protocol conversion of a packet input to and output from the ECU(s).

16. A computer-readable, non-transitory recording medium storing a program for causing a computer installed in a control apparatus that controls communication in a vehicle by setting a control entry(ies) to a plurality of switches relaying, by referring to the control entry(ies), a packet input to and output from an Electronic Control Unit(s) (ECU(s)) installed on the vehicle, to execute processes, the processes comprising:
a process of permitting connection of a device updating a program of the ECU(s); and
a process of performing operation of the control entry according to contents updating the program of the ECU(s).

17. The medium according to claim 16, wherein
the operation of the control entry(ies) is performed on the basis of data for update for reprogramming which updates a program of the ECU.

18. The medium according to claim 17, wherein
communication between a device performing the reprogramming and the ECU(s) subjected to the reprogramming is permitted, and
the operation of the control entry(ies) is executed after completion of the reprogramming.

19. The medium according to claim 17, wherein
the data for update includes changed contents of the control entry(ies), and
extraction of the changed contents of the control entry(ies) from the data for update is executed.

20. The medium according to claim 16, wherein
the operation of the control entry is to permit or prohibit communication between the ECUs corresponding to a function added by update of the program of the ECU(s).

* * * * *